(12) United States Patent
Sandrew et al.

(10) Patent No.: US 9,547,937 B2
(45) Date of Patent: Jan. 17, 2017

(54) THREE-DIMENSIONAL ANNOTATION SYSTEM AND METHOD

(71) Applicants: Jared Sandrew, San Diego, CA (US); Jill Hunt, San Diego, CA (US)

(72) Inventors: Jared Sandrew, San Diego, CA (US); Jill Hunt, San Diego, CA (US)

(73) Assignee: LEGEND3D, INC., Los Angeles, CA (US)

( * ) Notice: Subject to any disclaimer, the term of this patent is extended or adjusted under 35 U.S.C. 154(b) by 231 days.

(21) Appl. No.: 13/691,509

(22) Filed: Nov. 30, 2012

(65) Prior Publication Data

US 2014/0152648 A1    Jun. 5, 2014

(51) Int. Cl.
*G06T 15/00*     (2011.01)
*G06T 19/00*     (2011.01)
*H04N 13/02*     (2006.01)
*H04N 13/00*     (2006.01)

(52) U.S. Cl.
CPC ............. *G06T 19/00* (2013.01); *H04N 13/026* (2013.01); *G06T 2219/004* (2013.01); *H04N 13/004* (2013.01); *H04N 13/0022* (2013.01)

(58) Field of Classification Search
CPC ............... G06F 21/10; G06F 17/30247; G06F 17/30784; H04N 13/026; H04N 13/0055; H04N 13/0257; H04N 13/0267; H04N 21/47205; H04N 9/79; H04N 13/0022; H04N 13/004; G06T 19/00; G06T 2219/004
USPC ................................ 382/284, 276; 455/556.1
See application file for complete search history.

(56) References Cited

U.S. PATENT DOCUMENTS

| | | | |
|---|---|---|---|
| 2,593,925 | A | 4/1952 | Sheldon |
| 2,799,722 | A | 7/1957 | Neugebauer |
| 2,804,500 | A | 8/1957 | Giacoletto |
| 2,874,212 | A | 2/1959 | Bechley |
| 2,883,763 | A | 4/1959 | Schaper |

(Continued)

FOREIGN PATENT DOCUMENTS

| | | |
|---|---|---|
| DE | 003444353 | 6/1986 |
| EP | 03052454 | 2/1989 |

(Continued)

OTHER PUBLICATIONS

"Nintendo DSi Uses Camera Face Tracking to Create 3D Mirages", retrieved from www.Gizmodo.com on Mar. 18, 2013, 3 pages.

(Continued)

*Primary Examiner* — Sultana M Zalalee
(74) *Attorney, Agent, or Firm* — Arc IP Law, PC; Joseph J. Mayo

(57) ABSTRACT

Embodiments enable a three-dimensional annotation system and method that accepts desired depths for regions of input images and annotates two-dimensional/three-dimensional images with three-dimensional annotations for viewing at the desired depth(s) in any three-dimensional manner. Enables rapid and intuitive specification of desired depth and application of depth to regions in the two-dimensional images, or when editing three-dimensional images, as annotated by the three-dimensional annotations having at least one depth associated with the annotation. Enables rapid and intuitive depth augmentation or editing of an input image.

21 Claims, 7 Drawing Sheets
(4 of 7 Drawing Sheet(s) Filed in Color)

(56) References Cited

U.S. PATENT DOCUMENTS

| | | |
|---|---|---|
| 2,974,190 A | 3/1961 | Fine et al. |
| 3,005,042 A | 10/1961 | Horsley |
| 3,258,528 A | 6/1966 | Oppenheimer |
| 3,486,242 A | 12/1969 | Aronson |
| 3,551,589 A | 12/1970 | Moskoviz |
| 3,558,811 A | 1/1971 | Montevecchio et al. |
| 3,560,644 A | 2/1971 | Petrocelli et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et al. |
| 3,619,051 A | 11/1971 | Wright |
| 3,621,127 A | 11/1971 | Hope |
| 3,647,942 A | 3/1972 | Siegel |
| 3,673,317 A | 6/1972 | Newell et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reiffel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Daike et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen et al. |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,252,953 A | 10/1993 | Sandrew et al. |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,684,715 A | 11/1997 | Palmer |
| 5,699,444 A | 12/1997 | Palm |
| 5,717,454 A | 2/1998 | Adolphi et al. |
| 5,729,471 A | 3/1998 | Jain et al. |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,778,108 A | 7/1998 | Coleman |
| 5,784,175 A | 7/1998 | Lee |
| 5,784,176 A | 7/1998 | Narita |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,903 A | 11/1999 | Donovan |
| 5,999,660 A | 12/1999 | Zorin et al. |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |
| 6,119,123 A | 9/2000 | Elenbaas et al. |
| 6,132,376 A | 10/2000 | Hossack et al. |
| 6,141,433 A | 10/2000 | Moed et al. |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |

(56) References Cited

U.S. PATENT DOCUMENTS

| | | |
|---|---|---|
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |
| 6,226,015 B1 | 5/2001 | Danneels et al. |
| 6,228,030 B1 | 5/2001 | Urbano et al. |
| 6,263,101 B1 | 7/2001 | Klein |
| 6,271,859 B1 | 8/2001 | Asente |
| 6,314,211 B1 | 11/2001 | Kim et al. |
| 6,337,709 B1 | 1/2002 | Yamaashi et al. |
| 6,360,027 B1 | 3/2002 | Hossack et al. |
| 6,363,170 B1 | 3/2002 | Seitz et al. |
| 6,364,835 B1 | 4/2002 | Hossack et al. |
| 6,373,970 B1 | 4/2002 | Dong et al. |
| 6,390,980 B1 | 5/2002 | Peterson et al. |
| 6,416,477 B1 | 7/2002 | Jago |
| 6,426,750 B1 | 7/2002 | Hoppe |
| 6,445,816 B1 | 9/2002 | Pettigrew |
| 6,456,340 B1 | 9/2002 | Margulis |
| 6,466,205 B2 | 10/2002 | Simpson et al. |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amuah |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Aman et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,859,523 B1 | 2/2005 | Jilk et al. |
| 6,964,009 B2 | 11/2005 | Samaniego et al. |
| 6,965,379 B2 | 11/2005 | Lee et al. |
| 6,973,434 B2 | 12/2005 | Miller |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Connor et al. |
| 7,084,868 B2 | 8/2006 | Farag et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,123,263 B2 | 10/2006 | Harvill |
| 7,136,075 B1 | 11/2006 | Hamburg |
| 7,181,081 B2 | 2/2007 | Sandrew |
| 7,254,265 B2 | 8/2007 | Naske et al. |
| 7,260,274 B2 | 8/2007 | Sawhney et al. |
| 7,272,265 B2 | 9/2007 | Kouri et al. |
| 7,298,094 B2 | 11/2007 | Yui |
| 7,308,139 B2 | 12/2007 | Wentland et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,355,607 B2 | 4/2008 | Harvill |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,538,768 B2 | 5/2009 | Kiyokawa et al. |
| 7,542,034 B2 | 6/2009 | Spooner et al. |
| 7,558,420 B2 | 7/2009 | Era |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,663,689 B2 | 2/2010 | Marks |
| 7,680,653 B2 | 3/2010 | Yeldener |
| 7,772,532 B2 | 8/2010 | Olsen et al. |
| 7,852,461 B2 | 12/2010 | Yahav |
| 7,860,342 B2 * | 12/2010 | Levien et al. ............... 382/276 |
| 7,894,633 B1 | 2/2011 | Harman |
| 8,036,451 B2 | 10/2011 | Redert et al. |
| 8,085,339 B2 | 12/2011 | Marks |
| 8,090,402 B1 * | 1/2012 | Fujisaki .................... 455/556.1 |
| 8,194,102 B2 * | 6/2012 | Cohen et al. ............... 345/660 |
| 8,213,711 B2 | 7/2012 | Tam et al. |
| 8,217,931 B2 | 7/2012 | Lowe et al. |
| 8,244,104 B2 | 8/2012 | Kashiwa |
| 8,320,634 B2 | 11/2012 | Deutsch |
| 8,384,763 B2 | 2/2013 | Tam et al. |
| 8,401,336 B2 * | 3/2013 | Baldridge et al. ........... 382/284 |
| 8,462,988 B2 | 6/2013 | Boon |
| 8,488,868 B2 | 7/2013 | Tam et al. |
| 8,526,704 B2 | 9/2013 | Dobbe |
| 8,543,573 B2 | 9/2013 | Macpherson |
| 8,634,072 B2 | 1/2014 | Trainer |
| 8,644,596 B1 | 2/2014 | Wu et al. |
| 8,670,651 B2 | 3/2014 | Sakuragi et al. |
| 8,698,798 B2 * | 4/2014 | Murray et al. ............... 345/419 |
| 8,907,968 B2 | 12/2014 | Tanaka et al. |
| 8,922,628 B2 | 12/2014 | Bond |
| 2001/0025267 A1 | 9/2001 | Janiszewski |
| 2001/0051913 A1 | 12/2001 | Vashistha et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice |
| 2003/0046656 A1 | 3/2003 | Saxana |
| 2003/0069777 A1 | 4/2003 | Or-Bach |
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |
| 2004/0062439 A1 | 4/2004 | Cahill et al. |
| 2004/0189796 A1 | 9/2004 | Ho et al. |
| 2004/0258089 A1 | 12/2004 | Derechin et al. |
| 2005/0083421 A1 | 4/2005 | Berezin et al. |
| 2005/0088515 A1 | 4/2005 | Geng |
| 2005/0146521 A1 | 7/2005 | Kaye et al. |
| 2005/0188297 A1 | 8/2005 | Knight et al. |
| 2005/0207623 A1 | 9/2005 | Liu et al. |
| 2005/0231501 A1 | 10/2005 | Nitawaki |
| 2006/0061583 A1 | 3/2006 | Spooner et al. |
| 2006/0083421 A1 | 4/2006 | Weiguo et al. |
| 2006/0143059 A1 | 6/2006 | Sandrew |
| 2006/0159345 A1 | 7/2006 | Clary et al. |
| 2006/0274905 A1 | 12/2006 | Lindahl et al. |
| 2007/0052807 A1 | 3/2007 | Zhou et al. |
| 2007/0236514 A1 | 10/2007 | Agusanto et al. |
| 2007/0238981 A1 | 10/2007 | Zhu et al. |
| 2007/0260634 A1 | 11/2007 | Makela et al. |
| 2007/0286486 A1 | 12/2007 | Goldstein |
| 2007/0296721 A1 | 12/2007 | Chang et al. |
| 2008/0002878 A1 | 1/2008 | Meiyappan |
| 2008/0044155 A1 | 2/2008 | Kuspa |
| 2008/0079851 A1 | 4/2008 | Stanger et al. |
| 2008/0117233 A1 | 5/2008 | Mather et al. |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |

(56) References Cited

U.S. PATENT DOCUMENTS

| | | |
|---|---|---|
| 2008/0225045 A1 | 9/2008 | Birtwistle et al. |
| 2008/0225059 A1 | 9/2008 | Lowe et al. |
| 2008/0226123 A1 | 9/2008 | Birtwistle et al. |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0144772 A1* | 6/2009 | Fink ............ G06Q 30/02 725/42 |
| 2009/0147074 A1* | 6/2009 | Getty ............ A61B 6/466 348/51 |
| 2009/0179895 A1* | 7/2009 | Zhu ............ G06F 17/30241 345/424 |
| 2009/0219383 A1 | 9/2009 | Passmore |
| 2009/0256903 A1 | 10/2009 | Spooner et al. |
| 2009/0290758 A1 | 11/2009 | Ng-Thow-Hing et al. |
| 2009/0297061 A1 | 12/2009 | Mareachen et al. |
| 2009/0303204 A1 | 12/2009 | Nasiri et al. |
| 2010/0026784 A1 | 2/2010 | Burazerovic |
| 2010/0045666 A1 | 2/2010 | Kommann et al. |
| 2010/0166338 A1 | 7/2010 | Lee et al. |
| 2010/0289819 A1* | 11/2010 | Singh ............ G09G 3/003 345/619 |
| 2011/0050864 A1 | 3/2011 | Bond |
| 2011/0069152 A1 | 3/2011 | Wang et al. |
| 2011/0072397 A1* | 3/2011 | Baker ............ G06T 19/00 715/852 |
| 2011/0074784 A1 | 3/2011 | Turner |
| 2011/0081042 A1* | 4/2011 | Kim ............ H04N 13/0022 382/100 |
| 2011/0096832 A1 | 4/2011 | Zhang et al. |
| 2011/0109617 A1* | 5/2011 | Snook ............ G06T 17/00 345/419 |
| 2011/0158504 A1* | 6/2011 | Turner ............ H04N 13/026 382/154 |
| 2011/0161843 A1* | 6/2011 | Bennett ............ G06F 3/14 715/760 |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0039525 A1 | 2/2012 | Tian et al. |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0218382 A1 | 8/2012 | Zass |
| 2012/0249746 A1 | 10/2012 | Cornog et al. |
| 2012/0274626 A1 | 11/2012 | Hsieh |
| 2012/0274634 A1 | 11/2012 | Yamada et al. |
| 2012/0281906 A1 | 11/2012 | Appia |
| 2012/0306849 A1* | 12/2012 | Steen ............ 345/419 |
| 2012/0306874 A1 | 12/2012 | Nguyen et al. |
| 2013/0044192 A1 | 2/2013 | Mukherjee et al. |
| 2013/0051659 A1 | 2/2013 | Yamamoto |
| 2013/0063549 A1 | 3/2013 | Schnyder et al. |
| 2013/0234934 A1 | 9/2013 | Champion et al. |
| 2013/0258062 A1 | 10/2013 | Noh et al. |

FOREIGN PATENT DOCUMENTS

| | | |
|---|---|---|
| EP | 1187494 | 3/2002 |
| EP | 1719079 | 11/2006 |
| JP | 60-52190 | 3/1985 |
| JP | 2002123842 | 4/2002 |
| JP | 2003046982 | 2/2003 |
| JP | 2004-207985 | 7/2004 |
| KR | 20120095059 | 2/2012 |
| KR | 20130061289 | 11/2013 |
| SU | 1192168 A | 11/1982 |
| WO | 97/24000 | 7/1997 |
| WO | 99/12127 | 3/1999 |
| WO | 99/30280 | 6/1999 |
| WO | 00/79781 | 12/2000 |
| WO | 01/01348 | 1/2001 |
| WO | 02/13143 | 2/2002 |
| WO | 2006/078237 | 7/2006 |
| WO | 2007148219 | 12/2007 |
| WO | 2008/075276 | 6/2008 |
| WO | 2011/029209 | 3/2011 |
| WO | 2012016600 | 9/2012 |
| WO | 2013084234 | 6/2013 |

OTHER PUBLICATIONS

IPER, Mar. 29, 2007, PCT/US2005/014348, 5 pages.
IPER, Oct. 5, 2013, PCT/US2011/058182, 6 pages.
International Search Report, Jun. 13, 2003, PCT/US02/14192, 4 pages.
Partial Testimony, Expert: Samuel Zhou, Ph.D., 2005 WL 3940225 (C.D.Cal.), Jul. 21, 2005, 21 pages.
PCT ISR, Feb. 27, 2007, PCT/US2005/014348, 8 pages.
PCT ISR, Sep. 11, 2007, PCT/US07/62515, 9 pages.
CA Office Action, Dec. 28, 2011, Appl No. 2,446,150, 4 pages.
PCT ISR, Nov. 14, 2007, PCT/US07/62515, 24 pages.
PCT IPRP, Jul. 4, 2013, PCT/US2011/067024, 5 pages.
European Office Action dated Jun. 26, 2013, received for EP Appl. No. 02734203.9 on Jul. 22, 2013, 5 pages.
Ohm et al., An Object-Based System for Stereoscopic Viewpoint Synthesis, IEEE transaction on Circuits and Systems for Video Technology, vol. 7, No. 5, Oct. 1997, pp. 801-811.
Izquierdo et al., Virtual 3D-View Generation from Stereoscopic Video Data, IEEE, Jan. 1998, pp. 1219-1224.
Kaufman, D., "The Big Picture", Apr. 1998, http://www.xenotech.com Apr. 1998, pp. 1-4.
Hanrahan et al., "Direct WYSIWYG painting and texturing on 3D shapes", Computer Graphics, vol. 24, Issue 4, pp. 215-223. Aug. 1990.
Grossman, "Look Ma, No Glasses", Games, Apr. 1992, pp. 12-14.
Slinker et al., "The Generation and Animation of Random Dot and Random Line Autostereograms", Journal of Imaging Science and Technology, vol. 36, No. 3, pp. 260-267, May 1992.
A. Michael Noll, Stereographic Projections by Digital Computer, Computers and Automation, vol. 14, No. 5 (May 1965), pp. 32-34.
A. Michael Noll, Computer-Generated Three-Dimensional Movies, Computers and Automation, vol. 14, No. 11 (Nov. 1965), pp. 20-23.
Selsis et al., Automatic Tracking and 3D Localization of Moving Objects by Active Contour Models, Intelligent Vehicles 95 Symposium, Sep. 1995, pp. 96-100.
Smeulders et al., Tracking Nonparameterized Object Contours in Video, IEEE Transactions on Image Processing, vol. 11, No. 9, Sep. 2002, pp. 1081-1091.
Office Action for EPO Patent Application No. 02 734 203.9 dated Sep. 12, 2006. (4 pages).
Office Action for AUS Patent Application No. 2002305387 dated Mar. 9, 2007. (2 pages).
Office Action for EPO Patent Application No. 02 734 203.9 dated Oct. 7, 2010. (5 pages).
First Examination Report for Indian Patent Application No. 01779/DELNP/2003 dated Mar. 2004. (4 pages).
International Search Report Dated Jun. 13, 2003. (3 pages).
Declaration of Barbara Frederiksen in Support of In-Three, Inc's Opposition to Plaintiffs Motion for Preliminary Injunction, Aug. 1, 2005, *IMAX Corporation et al v. In-Three, Inc.*, Case No. CV05 1795 FMC (Mcx). (25 pages).
USPTO, Board of Patent Appeals and Interferences, Decision on Appeal dated Jul. 30, 2010, Ex parte Three-Dimensional Media Group, LTD, Appeal 2009-004087, Reexamination Control No. 90/007,578, U.S. Pat. No. 4,925,294. (88 pages).

(56) References Cited

OTHER PUBLICATIONS

Office Action for Canadian Patent Application No. 2,446,150 dated Oct. 8, 2010. (6 pages).
Office Action for Canadian Patent Application No. 2,446,150 dated Jun. 13, 2011. (4 pages).
International Search Report received fro PCT Application No. PCT/US2011/067024, dated Aug. 22, 2012, 10 pages.
Lenny Lipton, "Foundations of the Stereo-Scopic Cinema, a Study in Depth" With and Appendix on 3D Television, 325 pages, May 1978.
Interpolation (from Wikipedia encyclopedia, article pp. 1-6), retrieved from Internet URL:http://en.wikipedia.org/wiki/Interpolation on Jun. 5, 2008.
Optical Reader (from Wikipedia encyclopedia, article p. 1), retrieved from Internet URL:http://en.wikipedia.org/wiki/Optical_reader on Jun. 5, 2008.
Declaration of Steven K. Feiner, Exhibit A, 10 pages, Nov. 2, 2007.
Declaration of Michael F. Chou, Exhibit B, 12 pages, Nov. 2, 2007.
Declaration of John Marchioro, Exhibit C, 3 pages, Nov. 2, 2007.
Exhibit 1 to Declaration of John Marchioro, Revised translation of portions of Japanese Patent Document No. 60-52190 to Hiromae, 3 pages, Nov. 2, 2007.
U.S. Patent and Trademark Office, Before the Board of Patent Appeals and Interferences, Ex Parte Three-Dimensional Media Group, Ltd., Appeal 2009-004087, Reexamination Control No. 90/007,578, U.S. Pat. No. 4,925,294, Decision on Appeal, 88 pages, Jul. 30, 2010.
International Search Report dated May 10, 2012, 8 pages.
Machine translation of JP Patent No. 2004-207985, dated Jul. 22, 2008, 34 pages.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).
U.S. District Court, C.D. California, *IMAX v. In-Three*, No. 05 CV 1795, 2005, Partial Testimony, Expert: David Geshwind, WestLaw 2005, WL 3940224 (C.D.Cal.), 8 pages.
U.S. District Court, C.D. California, *IMAX Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, 2005 WL 3940223 (C.D.Cal.), 6 pages.
U.S. District Court, C.D. California, *IMAX v. In-Three*. No. 06 CV 1795. Jul. 21, 2005, Partial Testimony, Expert: Samuel Zhou, Ph.D., 2005 WL 3940225 (C.D.Cal.), 21 pages.
U.S. District Court, C.D. California, *Western Division, IMAX Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.
Noll et al., "Stereographic Projections by Digital Computer", Computers and Automation for May 1965, pp. 32-34.
Noll, "Computer-Generated Three-Dimensional Movies" Computers and Automation for Nov. 1965, pp. 20-23.
Murray et al., Active Tracking, IEEE International Conference on Intelligent Robots and Systems, Sep. 1993, pp. 1021-1028.
Gao et al., Perceptual Motion Tracking from Image Sequences, IEEE, Jan. 2001, pp. 389-392.
Yasushi Mae, et al., "Object Tracking in Cluttered Background Based on Optical Flow and Edges," Proc. 13th Int. Conf. on Pattern Recognition, vol. 1, pp. 196-200, Apr. 1996.
Di Zhong, Shih-Fu Chang, "AMOS: An Active System for MPEG-4 Video Object Segmentation," ICIP (2) 8: 647-651, Apr. 1998.
Hua Zhong, et al., "Interactive Tracker—A Semi-automatic Video Object Tracking and Segmentation System," Microsoft Research China, http://research.microsoft.com (Aug. 26, 2003).
Eric N. Mortensen, William A. Barrett, "Interactive segmentation with Intelligent Scissors," Graphical Models and Image Processing, v.60 n. 5, p. 349-384, Sep. 2002.
Michael Gleicher, "Image Snapping," SIGGRAPH: 183-190, Jun. 1995.
Joseph Weber, et al., "Rigid Body Segmentation and Shape Description . . . , " IEEE Transactions on Pattern Analysis and Machine Intelligence, vol. 19, No. 2, Feb. 1997,pp. 139-143.
E. N. Mortensen and W. A. Barrett, "Intelligent Scissors for Image Composition," Computer Graphics (SIGGRAPH '95), pp. 191-198, Los Angeles, CA, Aug. 1995.
International Search Report Issued for PCT/US2013/072208, dated Feb. 27, 2014, 6 pages.
International Search Report and Written Opinion issued for PCT/US2013/072447, dated Mar. 13, 2014, 6 pages.
Tam et al., "3D-TV Content Generation: 2D-To-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
International Preliminary Report on Patentability received in PCT/US2013/072208 on Jun. 11, 2015, 5 pages.
International Preliminary Report on Patentability received in PCT/US2013/072447 on Jun. 11, 2015, 12 pages.
European Search Report Received in PCTUS2011067024 on Nov. 28, 2014, 6 pages.
Zhang, et al., "Stereoscopic Image Generation Based on Depth Images for 3D TV", IEEE Transactions on Broadcasting, vol. 51, No. 2, pp. 191-199, Jun. 2005.
Beraldi, et al., "Motion and Depth from Optical Flow", Lab. Di Bioingegneria, Facolta' di Medicina, Universit' di Modena, Modena, Italy; pp. 205-208, 1989.
Hendriks, et al. "Converting 2D to 3D: A Survey", Information and Communication Theory Group, Dec. 2005.
Abstract of "A Novel Method for Semi-Automatic 2D to 3D Video Conversion", Wu, et al, IEEE 978-1-4244-1755-1, 2008, 1 Page.
Abstract of "Converting 2D Video to 3D: An Efficient Path to a 3D Experience", Cao, et al, IEEE 1070-986X, 2011, 1 Page.
Abstract of Learning to Produce 3D Media from a Captured 2D Video, Park et al., Eastman Kodak Research Journal of Latex Class files, vol. 6, Jan. 2007, 4 pages.
Abstract of "Efficient and high speed depth-based 2D to 3D video conversion", Somaiya et al., Springer 3DR Express 10, 1007, 2013, pp. 1-9.

\* cited by examiner

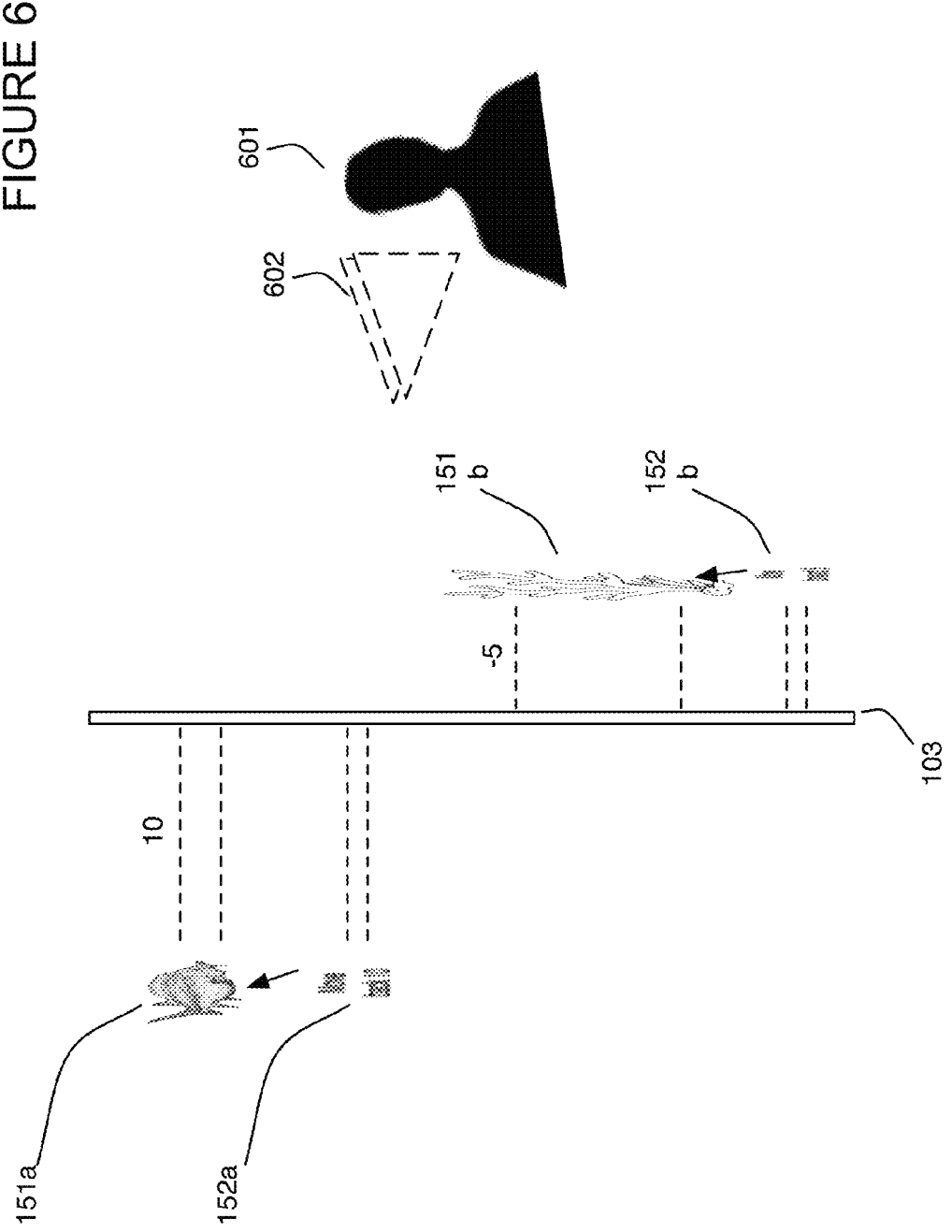

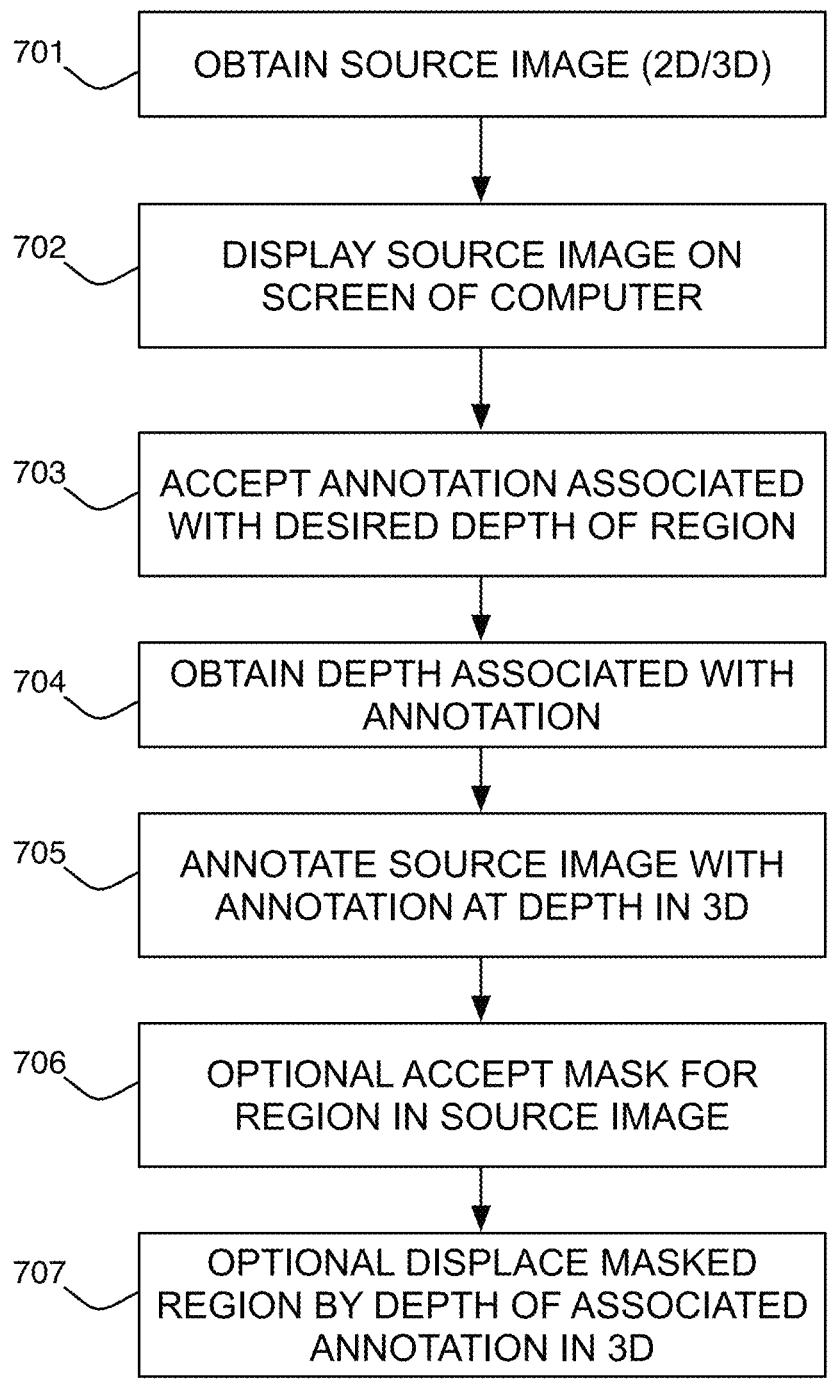

THREE-DIMENSIONAL ANNOTATION SYSTEM AND METHOD

BACKGROUND OF THE INVENTION

Field of the Invention

One or more embodiments of the invention are related to the field of image analysis and image enhancement and computer graphics processing of two-dimensional images into three-dimensional images. More particularly, but not by way of limitation, one or more embodiments of the invention enable a three-dimensional annotation system and method. Embodiments accept a desired depth for a region in a two-dimensional image, or three-dimensional image, and annotate the image with three-dimensional annotations at the desired depth for example. This enables rapid and intuitive depth alteration in three-dimensional images and conversion of two-dimensional images to three-dimensional images by enabling stereographers to specify depths for regions of images in an intuitive manner. Embodiments may display an annotated image with a corresponding stereoscopic image or pair of images for left and right eye viewing, or any other three-dimensional viewing enabled image, such as an anaglyph image.

Description of the Related Art

Three-dimensional images include any type of image or images that provide different left and right eye views to encode depth, some types of three-dimensional images require use of special glasses to ensure the left eye viewpoint is shown to the left eye and the right eye viewpoint is shown to the right eye of an observer. Existing systems that are utilized to convert two-dimensional images to three-dimensional images typically require rotoscoping of images to create outlines of regions in the images. The rotoscoped regions are then individually depth adjusted by hand to produce a left and right eye image, or single anaglyph image, or other three-dimensionally viewable image, such as a polarized three-dimensional image viewed with left and right lenses having different polarization angles for example. There is no easy way for stereographers to specify specific depths to apply to regions in a natural way. Thus, ad hoc depths are applied to images, and if the images are not acceptable, for example after client review, then there is no easy manner in which to provide easy feedback. Without a visual language to give creative and technical notes for the placement of objects, feedback can be unclear, causing more creative and technical iteration.

In addition, typical methods for converting movies from 2D to 3D in an industrial setting capable of handling the conversion of hundreds of thousands of frames of a movie with large amounts of labor or computing power, make use of an iterative workflow. The iterative workflow includes rotoscoping or modeling objects in each frame, adding depth and then rendering the frame into left and right viewpoints forming an anaglyph image or a left and right image pair. If there are errors in the edges of the masked objects for example, then the typical workflow involves an "iteration", i.e., sending the frames back to the workgroup responsible for masking the objects, (which can be in a country with cheap unskilled labor half way around the world), after which the masks are sent to the workgroup responsible for rendering the images, (again potentially in another country), wherein rendering is accomplished by either shifting input pixels left and right for cell animation images for example or ray tracing the path of light through each pixel in left and right images to simulate the light effects the path of light interacts with and for example bounces off of or through, which is computationally extremely expensive. After rendering, the rendered image pair is sent back to the quality assurance group. It is not uncommon in this workflow environment for many iterations of a complicated frame to take place. This is known as "throw it over the fence" workflow since different workgroups work independently to minimize their current workload and not as a team with overall efficiency in mind. With hundreds of thousands of frames in a movie, the amount of time that it takes to iterate back through frames containing artifacts can become high, causing delays in the overall project. Even if the re-rendering process takes place locally, the amount of time to re-render or ray-trace all of the images of a scene can cause significant processing and hence delays on the order of at least hours. Each iteration may take a long period of time to complete as the work may be performed by groups in disparate locations having shifted work hours. Elimination of iterations such as this would provide a huge savings in wall-time, or end-to-end time that a conversion project takes, thereby increasing profits and minimizing the workforce needed to implement the workflow.

Hence there is a need for a three-dimensional annotation system and method.

BRIEF SUMMARY OF THE INVENTION

Embodiments of the invention accept inputs from a stereographer that indicate depths at which to place regions or object volumes within a two dimensional image that are utilized to create stereoscopic viewable images, e.g., two horizontally offset left and right eye viewpoints or images. In one or more embodiments of the invention, the input is accepted by the system and displayed at the depth indicated on the three-dimensional version of the two-dimensional input image. In one or more embodiments, the depth may be specified using a graphical input device, such as a graphics drawing tablet. In other embodiments or in combination, depths may be input via a keyboard, obtained through analysis of the input, e.g., script or text to annotate with, or via voice commands while drawing annotation information or symbols for example.

In one scenario of the conversion workflow, a mask group takes source images and creates masks for items, areas or human recognizable objects in each frame of a sequence of images that make up a movie. Stereographers utilize embodiments of the invention to specify depths, for example with annotations that are shown at the desired depth along with any other information, to apply to particular regions, for example the masked regions from the mask group, in each image. The depth augmentation group applies the specified depths, and for example shapes, to the masks created by the mask group. Embodiments of the invention make this process extremely intuitive as the depth to apply is shown with information at the desired depth. Optionally, the depth may be applied before or independent of the masking process for example.

When rendering an image pair, left and right viewpoint images and left and right absolute translation files, or a single relative translation file may be generated and/or utilized by one or more embodiments of the invention. The translation files specify the pixel offsets for each source pixel in the original 2D image, for example in relative or absolute form respectively. These files are generally related to an alpha mask for each layer, for example a layer for an actress, a layer for a door, a layer for a background, etc. These translation files, or maps are passed from the depth augmentation group that renders 3D images, to the quality assurance workgroup or depending on the project size, a stereographer and/or associate stereographer. This allows the quality assurance workgroup (or other workgroup such as the depth augmentation group) to perform real-time editing of 3D images without re-rendering for example to alter layers/ colors/masks and/or remove artifacts such as masking errors without delays associated with processing time/re-rendering and/or iterative workflow that requires such re-rendering or sending the masks back to the mask group for rework, wherein the mask group may be in a third world country with unskilled labor on the other side of the globe. In addition, when rendering the left and right images, i.e., 3D images, the Z depth of regions within the image, such as actors for example, may also be passed along with the alpha mask to the quality assurance group, who may then adjust depth as well without re-rendering with the original rendering software. This may be performed for example with generated missing background data from any layer so as to allow "downstream" real-time editing without re-rendering or ray-tracing for example.

Quality assurance may give feedback to the masking group or depth augmentation group for individuals so that these individuals may be instructed to produce work product as desired for the given project, without waiting for, or requiring the upstream groups to rework anything for the current project. This allows for feedback yet eliminates iterative delays involved with sending work product back for rework and the associated delay for waiting for the reworked work product. Elimination of iterations such as this provide a huge savings in wall-time, or end-to-end time that a conversion project takes, thereby increasing profits and minimizing the workforce needed to implement the workflow.

In summary, embodiments of the invention minimize iterative workflow by providing more intuitive instructions regarding depth for another workgroup to utilize. For example, embodiments of the invention enable eliminate iterative workflow paths back through different workgroups by enabling other workers or workgroups to have an intuitive method in which to view depth instructions and successfully input the correct depth. Great amounts of time are saved by eliminating re-rendering by other work groups, and allow depth to be correctly input local to a work group. Embodiments of the system thus greatly aid the artist in the enhancement of images to include depth by providing realistic depth information once, to minimize manual manipulation of images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows a masked version of the two-dimensional image showing regions within each object to apply depth to.

FIG. 6 shows a logical side view of the depth applied to the annotations and optionally to the regions that may be masked for example and depth augmented as per the associated annotation.

FIG. 7 illustrates a flowchart illustrating an embodiment of the method implemented by one or more embodiments of the system of FIG. 1.

DETAILED DESCRIPTION OF THE INVENTION

Figure 1:
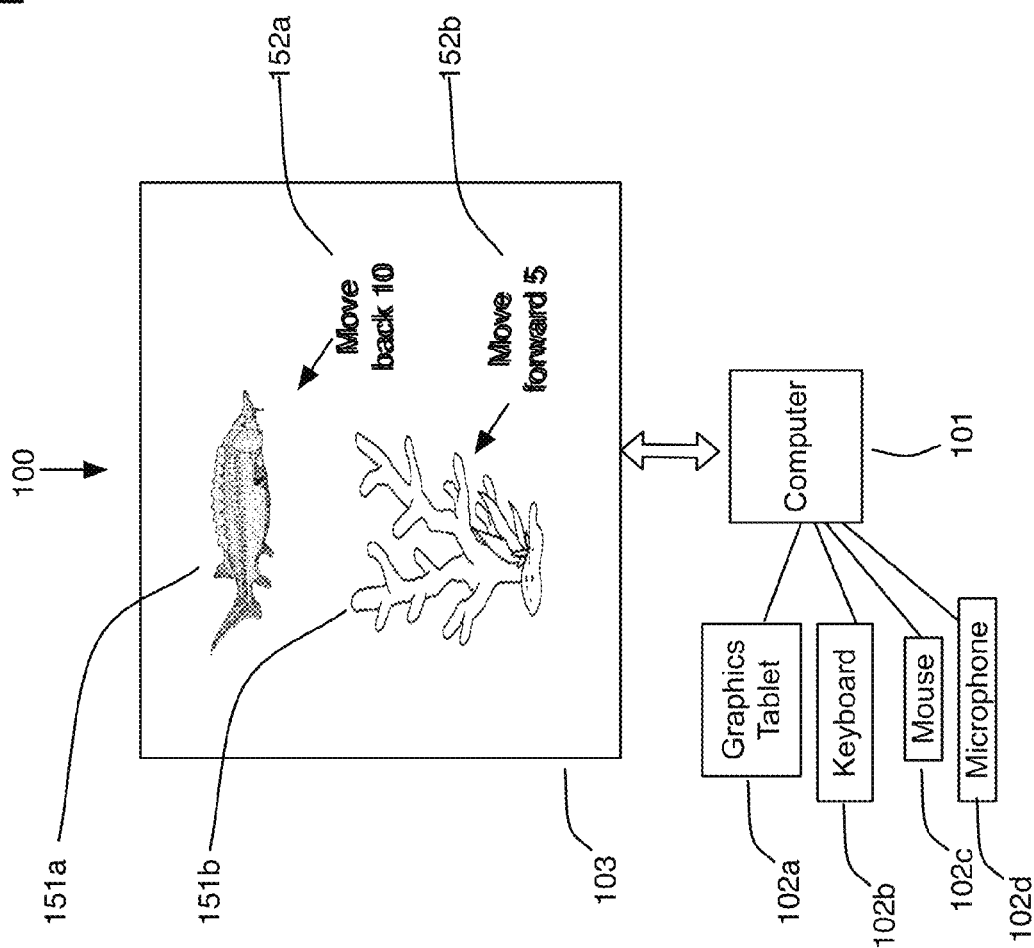
FIG. 1 shows an architectural view of an embodiment of the system.

FIG. 1 shows an architectural view of an embodiment of the system 100. As illustrated, computer 101 is coupled with any combination of input devices including graphics tablet 102a, keyboard 102b, mouse 102c and/or microphone 102d. Computer 101 may obtain a two-dimensional image and display the image on screen 103. Screen 103 may display a single image that may be viewed at depth, for example as an anaglyph using two different colors shifted left and right that may be viewed with glasses with lenses of two different colors, e.g., Red and Blue to view the image as a three-dimensional image for example. In general, the two-dimensional image may have multiple regions that are to be converted to different depths, for example first region 151a, e.g., a fish and second region 151b, coral for ease of illustration. In other scenarios, embodiments of the invention may be utilized to amend or otherwise change or alter depth of three-dimensional input images. Other embodiments may be utilized to annotate convergence for blending a feature film and/or alteration of native stereo elements with positive or negative depth with respect to the screen plane for example. Regardless of the input image type, embodiments of the system accept annotation associated with desired depths from input devices 102a-d, for example first annotation 152a and second annotation 152b. Any number of regions or annotations may be accepted by embodiments of the system. In one or more embodiments of the invention, the annotation itself may be analyzed to obtain the desired depth associated with a given region, or any input from the same or other input device may be utilized to obtain the desired depth. The annotation is then placed at the depth thus obtained, which results in three-dimensional annotations 152a and 152b displayed at the depth thus obtained from the annotation itself, e.g., from numbers in the annotation via optical character recognition or other handwriting recognition software for example. The depth may be the desired depth of an associated object or for example the depths of the four corners of the screen or any other depth associated with the annotation for example. The annotation may include general comments at a particular depth and not associated with a specific region for example.

In one or more embodiments of the invention, obtaining the depth includes analyzing the annotation with text recognition software to determine the depth. For example, if mouse or graphics tablet 102c or 102a is utilized to cursively drawing the annotation, the input may be analyzed by text recognition software to determine if a numerical value exists within the cursive text, for example "10" or "5" as obtained from annotations 152a and 152b. In addition, keywords or characters such as "+", "−", "forward", "back", etc., may be obtained via text recognition software and applied to the depth of the annotation automatically for example. Alternatively, or in combination, the mouse input may be utilized to for example drag up or down to adjust the annotation and add text next to an arrow annotation for example to show that the annotation is "10" or "5", for example which changes as the mouse is dragged and automatically updated in the annotation, while the annotation itself moves forward or backward. Alternatively, or in combination, the keyboard may be utilized to accept annotations or depths associated with annotations. The input text from the keyboard may be parsed to obtain keywords, characters or numbers for example to automatically either augment the annotation or move the annotation in depth or both. Alternatively, or in combination, the microphone may be monitored and depth accepted therefrom to automatically augment the annotation or move the annotation in depth or by asserting voice recognition software to determine keywords, characters or numbers.

Embodiments of the system may thus be utilized in obtaining a two-dimensional source image, displaying the two-dimensional source image on the screen associated with the computer, accepting an annotation associated with a desired depth of a region within the two-dimensional source image via any of the input devices coupled with the computer, obtaining a depth associated with the annotation as described above, and annotating the two-dimensional image with the annotation at the depth in a three-dimensional image, i.e., an image that has at least the annotations displayed at depth.

Embodiments of the system annotate the two-dimensional image with the annotation at the depth by generating an image encoded with left and right viewpoints or a pair of images comprising an image for viewing with a left and right eye respectively wherein the pair of images includes the annotation and the two-dimensional source image. In one or more embodiments the resulting image is a single anaglyph image, or polarized image, or any other type of image that includes the annotation shown at depth along with the two-dimensional source image.

Before or after accepting the desired depth of any portions or regions of a two-dimensional image, the computer or any other computer that may access the resulting annotated image, may accept at least one mask associated with the region of the two-dimensional source image. In other words, masking may take place before or after the annotation of the two-dimensional image. Embodiments of the system may then displace at least a portion of the region, for example a particular side, or middle or any other portion, in the two-dimensional source image left and right based on the depth to create a resulting output three-dimensional image.

When the resulting depth appears to be acceptable based on the requirements of the particular project, the system may output a three-dimensional image without the annotation. In movie-based projects, this may entail large numbers of images and tweening for example between key frames or other images generated with one or more embodiments of the system.

Figure 2:
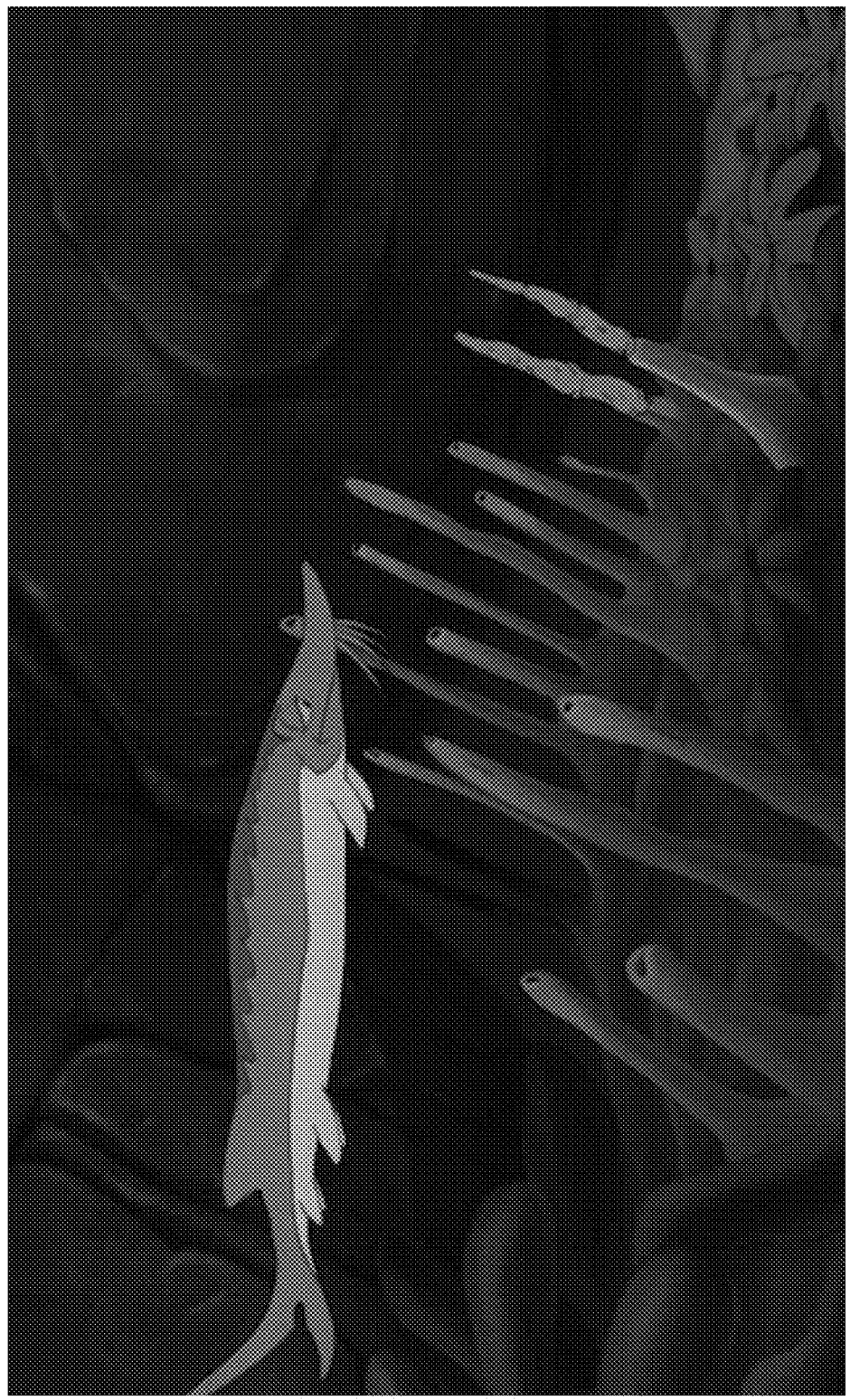
FIG. 2 shows an input two-dimensional image.
Figure 3:
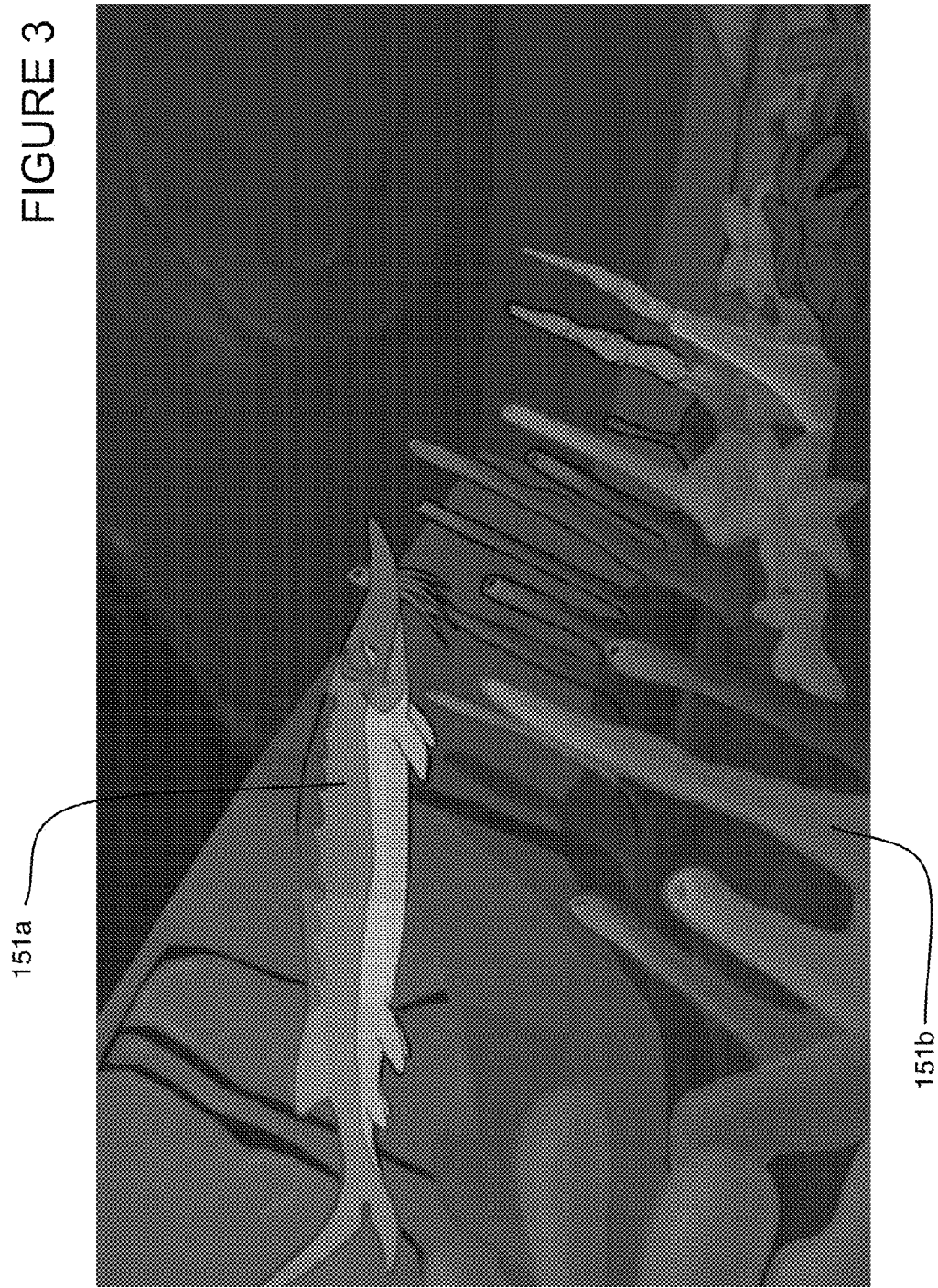
Figure 4:
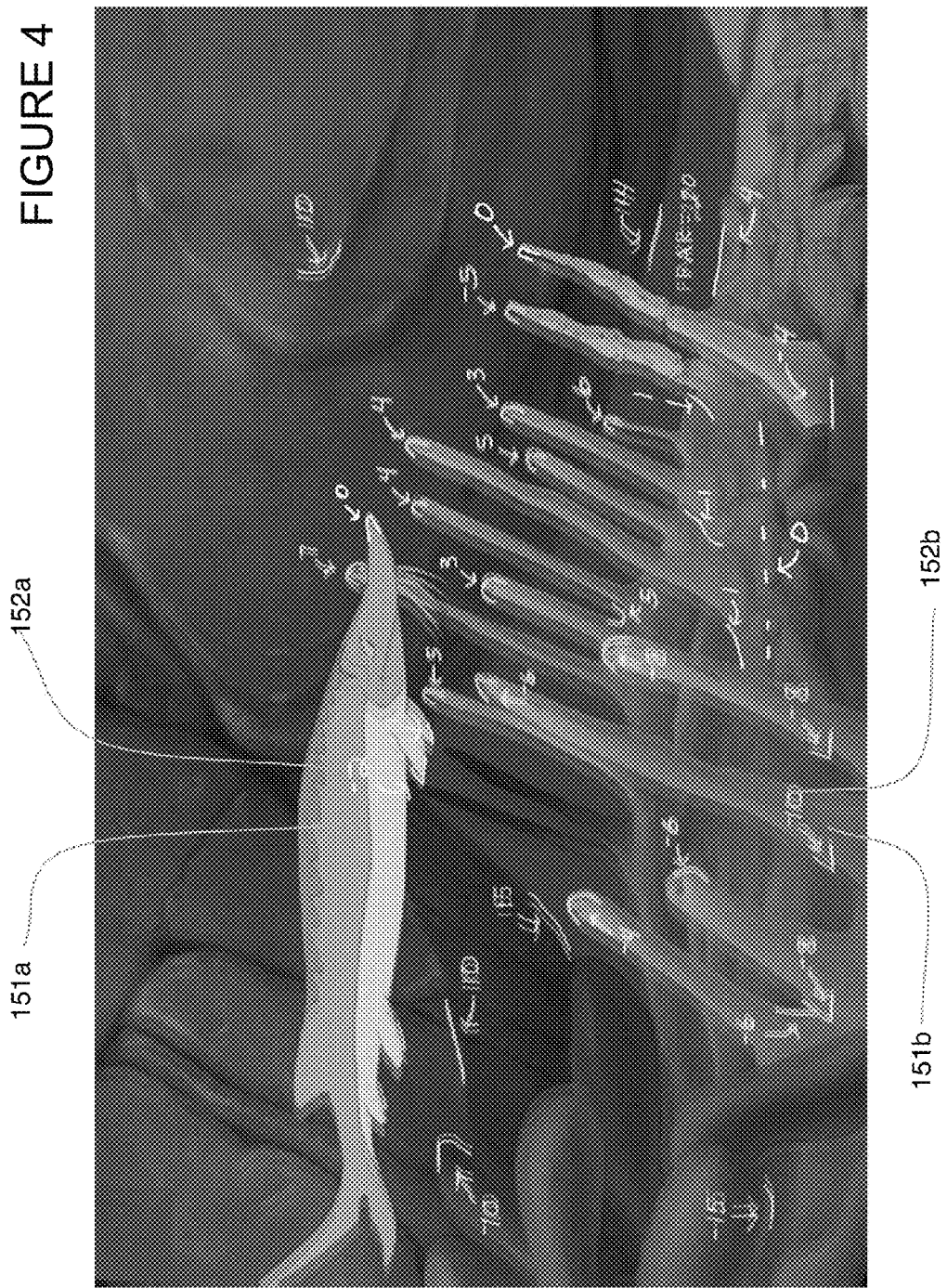
FIG. 4 shows annotations for desired depth at a specific depth for general messages, or at the depth of the desired region for example, wherein the annotations may be viewed in three-dimensional depth with anaglyph glasses.

FIG. 2 shows an input two-dimensional image. Embodiments of the invention may be utilized on cell animation or photographic or rendered or any other type of images. As shown, an exemplary object such as a fish is shown near vertically oriented structures, which may represent coral or other structures. FIG. 3 shows a masked version of the two-dimensional image showing regions within each object to apply depth to. In one or more embodiments, the regions are utilized to apply depths that vary over the region to create regions that are not flat, i.e., not at the same depth across the entire region. As shown, region 151a includes many sub-regions or masks, shown as different colors along the sides and back of the fish, which are not shown in the unmasked version of FIG. 2. FIG. 4 shows annotations for desired depth at a specific depth for general messages or at the depth of the desired region for example, wherein the annotations may be viewed in three-dimensional depth with anaglyph glasses. As shown, the two-dimensional image is still in two-dimensions, i.e., the depth across the entire image does not vary. In other words, the two-dimensional image along with the three-dimensional annotations specify the depths to apply to particular areas or regions and is used as an input to the depth augmentation group for example. The depth group then moves the associated regions in depth to match the annotations in an intuitive manner that is extremely fast and provides a built-in sanity check for depth. Using this method, it is inherently verifiable whether a depth of a region is at or about at the depth of the associated annotation.

Figure 5:
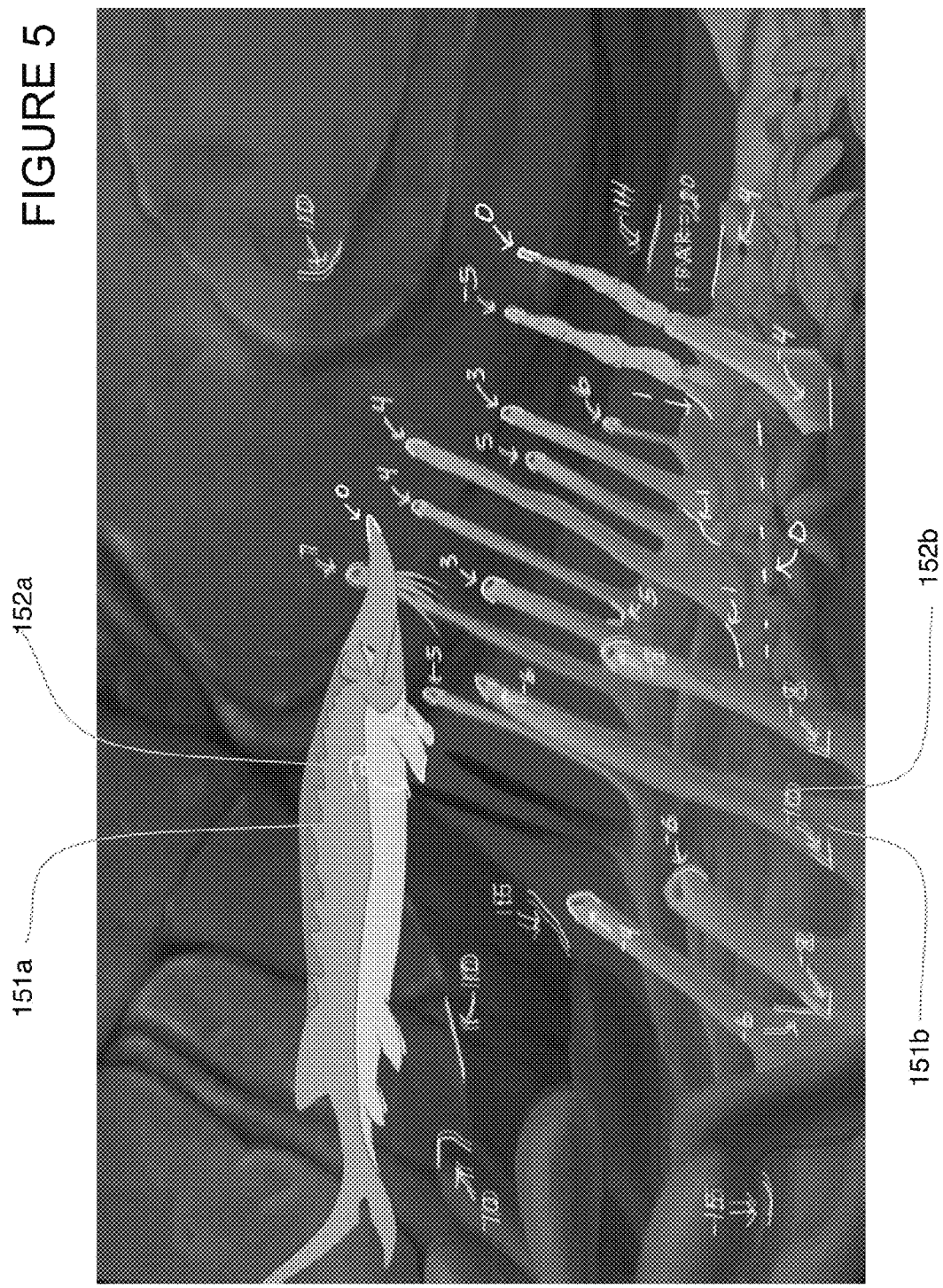
FIG. 5 shows the input image converted to three-dimensional image in anaglyph format, which may be viewed in three-dimensional depth with anaglyph glasses to view separate left and right eye viewpoints from one image.

FIG. 5 shows the input image converted to three-dimensional image in anaglyph format, which may be viewed in three-dimensional depth with anaglyph glasses. As shown, the individual coral pieces are at the specified depths, for example, nearest ones at "−10" at region 151b having associated annotation 152b, with the furthest ones at "4", "5", and "7", while the region of the nose of the fish 151a is at "0" and the fins are at offset "−2" as shown associated with annotation 152a. In one or more embodiments these numbers may indicate the left and right shift in pixels or the depth in feet/meters of the particular regions, or any other quantitative value associated with distance or depth. In other embodiments of the invention, the polarity may be such that positive numbers represent depths further away from the viewer.

As illustrated, embodiments of the invention minimize iterative workflow by providing more intuitive instructions regarding depth for another workgroup to utilize. Thus, the system and method implemented by the system eliminate iterative workflow paths back through different workgroups by enabling other workers or workgroups to have an intuitive method in which to view depth instructions and successfully input the correct depth. Great amounts of time are saved by eliminating re-rendering by other work groups, and allow depth to be correctly input local to a work group. Embodiments of the system thus greatly aid the artist in the enhancement of images to include depth by providing realistic depth information once, to minimize manual manipulation of images.

In one or more embodiments, a particular annotation may itself have a differing depth along the annotation to show how a depth varies, i.e., is not constant or flat across a region. For example, an annotation may show a curve from a first depth to a second depth along the annotation so that the annotation has a depth range. In this case more than one number for depth may be associated with a particular annotation and analyzed by the system to shift a portion of the annotation nearer or further than another portion of the same annotation. There is no limit to the number of depths that a particular annotation may be placed at. As shown in FIG. 5, the bottom right annotation shows a depth of −14 and −4 with a "far" depth of −20, which is analyzed by an embodiment of the invention to designate that region of the image as having a depth that ranges between the three annotated depths, wherein an embodiment of the invention may thus set the depth of the masked region to as shown by shifting closer annotated portions farther left and right that deeper areas respectively.

FIG. 6 shows a logical side view of the depth applied to the annotations and optionally to the regions that may be masked for example and depth augmented as per the associated annotation. FIG. 6 illustrates the depth applied to FIGS. 1 and 2 from a side view of screen 103 to show the depth applied to the annotations 152a and 152b (see also FIG. 4 with anaglyph glasses on), and optionally to the associated regions 151a and 151b, once the associated depth notated in the annotations is applied to the regions (see also FIG. 5 with anaglyph glasses on). As shown, the annotations are at depth for three-dimensional or stereoscopic viewing 602 to aid in the application of depth to the associated regions for example wherein a viewer 601 is shown at the right side of screen 103.

FIG. 7 illustrates a flowchart illustrating an embodiment of the method implemented by one or more embodiments of the system of FIG. 1. As shown, the method includes obtaining the source image at 701, displaying the source image on the screen of the computer shown in FIG. 1, as per 702, accepting annotation associated with the desired depth of the region at 703, obtaining a depth associated with the annotation at 704 in a number of ways previously described with respect to the system, annotating the source image with the annotation in three-dimensions, for stereoscopic viewing at 705. From the viewpoint of depth workers viewing the annotations at depth, the annotations are utilized to show where depth should be applied and the system may accept masks for regions in the source image at 706 and then optionally display the regions as well at 707, and which is shown in FIG. 6. Although the annotations may not be at the same depth as the associated regions or may not even have associated regions, i.e., may simply be annotations at depth to aid in understanding something associated with the source image, the annotations at depth greatly speed and aid the process of working on images that may include depth.

While the invention herein disclosed has been described by means of specific embodiments and applications thereof, numerous modifications and variations could be made thereto by those skilled in the art without departing from the scope of the invention set forth in the claims.

What is claimed is:

1. A three-dimensional annotation method comprising:
    obtaining a source image that is two-dimensional or three-dimensional;
    displaying said source image on a screen associated with a first computer;
    accepting an annotation associated with a desired depth of a region within said source image via an input device coupled with said first computer;
    obtaining at least one depth associated with said annotation;
    wherein said at least one depth corresponds with said desired depth of said region; and,
    annotating said source image with said annotation at said at least one depth in a three-dimensional image;
    generating an annotated stereoscopic image that comprises left and right eye views that differ from each other having said annotation at said at least one depth that differs from a depth of said region; and,
    generating an output stereoscopic image with said region at said same depth as said at least one depth of said annotation.

2. The method of claim 1 wherein said input device comprises a graphics tablet, a mouse, or a keyboard and wherein said accepting said annotation comprises accepting input from said graphics tablet, said mouse or said keyboard respectively.

3. The method of claim 1 wherein said input device comprises a microphone and wherein said accepting said annotation comprises accepting input from said microphone.

4. The method of claim 1 wherein said obtaining said at least one depth comprises analyzing said annotation with text recognition software to determine said at least one depth.

5. The method of claim 1 wherein said obtaining said at least one depth comprises analyzing motion of a mouse to determine said at least one depth.

6. The method of claim 1 wherein said obtaining said at least one depth comprises parsing alphanumeric data from a keyboard to determine said at least one depth.

7. The method of claim 1 wherein said obtaining said at least one depth comprises asserting voice recognition software.

8. The method of claim 1 wherein said generating said annotated stereoscopic image comprises generating a pair of images comprising a left image to view with a left eye and a right eye image to view with a right eye respectively wherein said pair of images includes said annotation and said source image.

9. The method of claim 1 wherein said generating said annotated stereoscopic image comprises generating an anaglyph image comprising a left eye colored image and a right eye colored image that are combined and that includes said annotation and said source image.

10. The method of claim 1 wherein said generating said annotated stereoscopic image comprises generating a polarized image comprising a left eye image polarized in a first axis and a right eye image polarized in a second axis orthogonal to said first axis that are combined and that includes said annotation and said source image.

11. The method of claim 1 wherein said generating said annotated stereoscopic image comprises generating a single image capable of displaying left and right eye viewpoints to a left eye and right eye respectively with differing depths that includes said annotation and said source image.

12. The method of claim 1 further comprising:
    accepting at least one mask associated with said region of said source image.

13. The method of claim 1 further comprising:
    displacing at least a portion of said region in said source image left and right based on said at least one depth to create said three-dimensional image.

14. The method of claim 1 further comprising:
    displacing at least a portion of said region in said source image left and right based on said at least one depth to create an output three-dimensional image without said annotation.

15. The method of claim 1 wherein said annotating said source image with said annotation at said at least one depth occurs before moving at least a portion of said region in said source image left and right to alter depth within the source image.

16. The method of claim 1 wherein said annotating said source image with said annotation at said at least one depth comprises annotating said source image with a plurality of annotations that each comprise a different depth.

17. A three-dimensional annotation method comprising:
    obtaining a source image that is two-dimensional or three-dimensional;
    displaying said source image on a screen associated with a first computer;
    accepting an annotation associated with a desired depth of a region within said source image via an input device coupled with said first computer wherein said input device comprises any combination of graphics tablet, mouse, keyboard or microphone;

obtaining a at least one depth associated with said annotation by analyzing said annotation with text recognition software or by analyzing motion of a mouse or by parsing alphanumeric data from said keyboard or by asserting voice recognition software or any combination thereof;

wherein said at least one depth corresponds with said desired depth of said region;

and, annotating said source image with said annotation at said at least one depth in a three-dimensional image wherein said annotating said source image with said annotation at said at least one depth occurs before moving at least a portion of said region in said source image left and right to alter depth within the source image; and, generating an output stereoscopic image with said region at said same depth as said at least one depth of said annotation.

18. The method of claim 17 further comprising:
accepting at least one mask associated with said region of said source image.

19. The method of claim 17 further comprising:
displacing at least a portion of said region in said source image left and right based on said at least one depth to create said three-dimensional image.

20. The method of claim 17 further comprising:
displacing at least a portion of said region in said source image left and right based on said at least one depth to create an output three-dimensional image without said annotation.

21. The method of claim 17 wherein said annotating said source image with said annotation at said at least one depth comprises annotating said source image with a plurality of annotations that each comprise a different depth.

* * * * *